Figure 1:
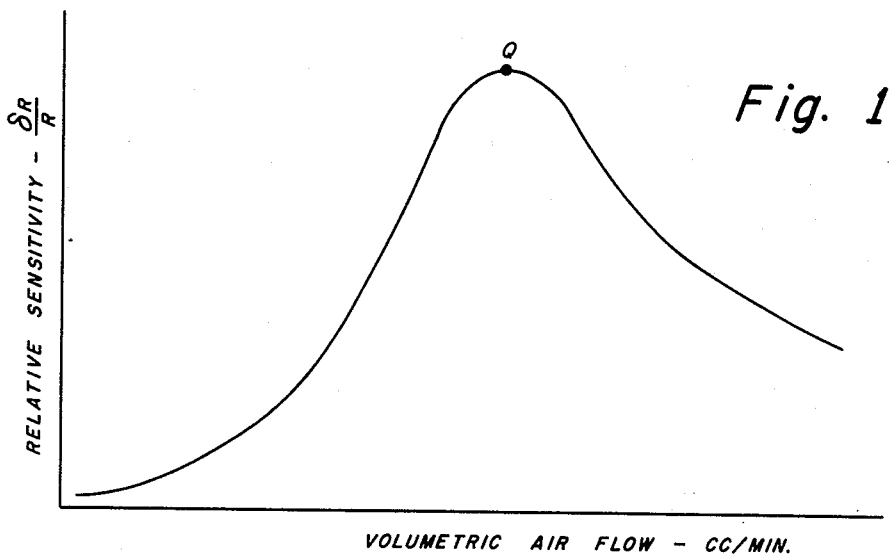

May 10, 1960    J. R. DALE    2,936,343
HOT WIRE AUDITORY DEVICE
Filed June 20, 1957

INVENTOR.
JOHN R. DALE
BY
ATTORNEYS ns
2,936,343
HOT WIRE AUDITORY DEVICE

John R. Dale, Willow Grove, Pa., assignor to the United States of America as represented by the Secretary of the Navy Application June 20, 1957, Serial No. 667,058

5 Claims. (Cl. 179—113)

(Granted under Title 35, U.S. Code (1952), sec. 266)

The invention described herein may be manufactured and used by or for the Government of the United States of America for governmental purposes without the payment of any royalties thereon or therefor.

The present invention relates to a hot wire auditory device and more particularly to a hot wire auditory device having a constant sensitivity.

An inherent characteristic of a hot wire microphone is that its sensitivity to auditory undulations varies as a function of the velocity of the air passing over the hot wire. The output response of such an instrument, therefore, is directly proportional to the undulations only if the volumetric air flow or more precisely the mass air flow can be maintained at some constant rate. In laboratory applications, this limitation presents no particular difficulty since a manually operated needle valve may be conveniently used to precisely control the volumetric rate of air flowing through an orifice, although such manually operated means presents a disadvantage in that the flow must be periodically monitored and the needle valve accordingly must be manually adjusted. However, hot wire auditory instrumentalities find a unique contemporary application as sensing devices in missiles and rockets, wherein manually operated flow regulating means, of course, are definitely precluded during in-flight operation. An existing method used for achieving a constant volumetric air flow for the maintenance of a maximum invariant sensitivity of a hot wire instrument is to provide in the missile a relatively large container, sealed at atmospheric pressure. The container is ruptured at the operational altitude of the missile, and a substantially constant differential pressure is maintained for a very limited period of the order of much less than a minute, thereby providing during this interval a relatively constant rate of air flowing past the hot wire. This technique is of limited value, because the restricted size of the container permits operation only during a time interval of very short duration, and because the incorporation of such a container in a missile imposes a severe weight and space penalty.

In order to maintain the sensitivity of the hot wire microphone to auditory undulations at a constant maximum level, in accordance with the present invention, the inherent operating characteristics of this microphone may be combined with the distinctive operational features of a critical pressure nozzle, sometimes termed a sonic nozzle, which operates to achieve a constant mass air flow when the ratio of the exit pressure to the entrance pressure does not exceed a predetermined fractional value. In order to enhance the frequency response of the microphone, the microphone structure and the nozzle may be spaced within a capsule to form a resonant cavity of the Helmholtz type. For a compressible fluid such as that of air, aerodynamic principles dictate that a physical realization of constant mass flow is obtained when a minimum pressure ratio exists such that a sonic velocity is present in the throat of the nozzle. Thus, in the instant invention, the nozzle configuration and throat diameter is precisely that necessary to obtain sonic flow, in accordance with the well-known theoretical design considerations thereof. In addition, the feasibility of maintaining a minimum pressure ratio necessary for a constant mass flow is fully assured in missile and rocket applications.

An object of the present invention is the provision of a hot wire auditory device in which the sensitivity thereof is automatically maintained at a constant maximum level.

Another object is to provide a hot wire auditory device in which the sensitivity is maintained at a constant maximum level by the provision of a constant mass flow of air past a hot wire.

A further object of the invention is the provision of a hot wire auditory device in which the sensitivity is maintained at a constant maximum level by providing a mass flow of air past the hot wire that is constant and independent of outlet pressure variations below a critical outlet to inlet pressure ratio.

A final object of the present invention is the provision of a hot wire auditory device in which the sensitivity to auditory undulations is automatically maintained at a maximum constant level by the maintenance of a mass flow of air past a hot wire that is constant and independent of outlet pressure variations below a critical outlet to inlet pressure ratio, which ratio is principally determinable by the speed of the missile or rocket embodying the instant invention.

Figure 2:
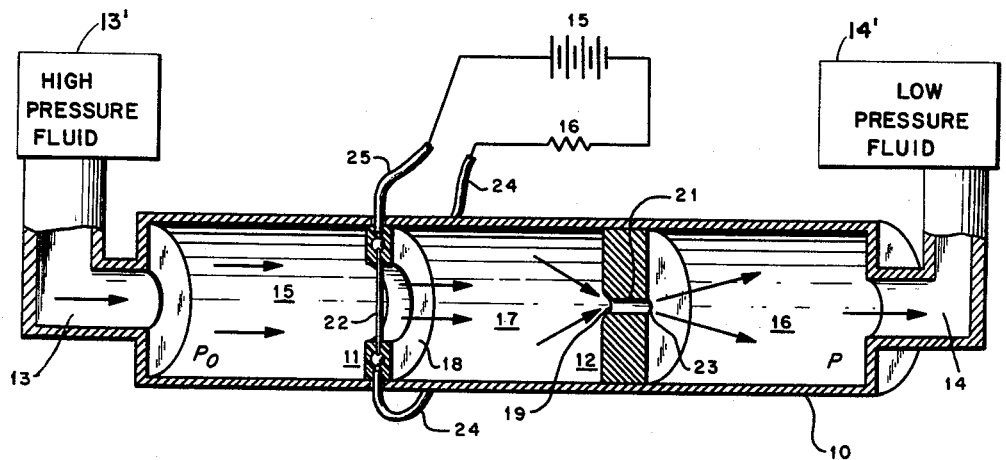

The exact nature of this invention as well as other objects and advantages thereof will be readily apparent from consideration of the following specification relating to the annexed drawing in which:

Fig. 1 illustrates a representative sensitivity curve of a hot wire microphone showing the relative manner in which the rate of change of resistance of an exemplary type platinum hot wire filament varies with respect to its intrinsic resistance as a function of the volumetric or mass air flow thereover, and Fig. 2 is a cross-sectional isometric view in schematic representation of a preferred embodiment of the instant invention.

Referring now to the drawing, there is shown in Fig. 1 a representative sensitivity curve for a hot wire microphone. The rate of change of resistance with respect to the intrinsic resistance is shown plotted as a function of the volumetric or mass air flowing by a hot platinum wire, which carries an electrical current. For given values of operating current and resistance, the sensitivity curve indicates that an optimum peak value of $\delta R/R$ may be maintained in the instrument consonant with a particular volumetric rate of air flow. In this region of operation designated by point Q, the amplitude of the undulations superimposed on the moving column of air is most effective to modify cooling of the platinum wire, and thereby, the resistance thereof in direct proportion to the amplitude of the undulations. It is a desideratum, therefore, that if a maximum invariant sensitivity is to be realized, a constant flow having a particular favorable velocity must be maintained. In one embodiment of the invention, a volumetric flow of the order of 250 cc./min. is required in order to obtain maximum sensitivity of the hot wire microphone.

The curvature of the sensitivity curve of Fig. 1 as a function of the volumetric air flow may be substantiated by assuming that the hot wire is most susceptible to cooling for a particular set of current and resistance parameters. Based upon this assumption, the peak value of the sensitivity at a particular volumetric flow of air is attributable to the fact that an amount of heat is produced at the surface of the boundary layer encompassing the wire that is in exact equilibrium with the effective heat absorbing capacity of the moving column of air in the presence of these parameters. To the left of the peak value of $\Delta R/R$ coincident with point Q, the steady state velocity of the air is not sufficient to remove the heat effectively from the boundary layer, and in effect, the hot wire has insulated itself from external influences due to the now greatly increased heat accumulated in the boundary layer. To the right of the peak value of $\Delta R/R$, the effect of the steady state velocity to cool the wire and thereby to change its resistance is proportional to the square of the velocity. On the other hand, the auditory undulations which consist of compressions and rarefactions in the mobile air column may be expressed as V sine $wt$ in which the velocity V is indicated as an amplitude factor, a direct or first power function. Therefore, the sensitivity of a hot wire instrumentality to changes in the amplitude level of auditory undulations progressively diminishes with an increase in steady state velocity, or the volumetric rate of air flow.

Referring next to Fig. 2 in which is illustrated a cross-sectional isometric view of the preferred embodiment of the instant invention, numeral 10 designates a generally cylindrically shaped capsule which embodies in a schematic representation a conventional hot wire microphone 11 and a critical pressure or sonic nozzle 12, of general convergent-divergent configuration. The cylindrically shaped capsule as well as the nozzle may be preferably of metallic material, although the functions of each may be served equally well by embracing a plastic composition, or the like. An inlet or high pressure side and an outlet or low pressure variable side are depicted by numerals 13 and 14, respectively. In missile applications, a constant high pressure $P_0$ is maintained in chamber 15 by virtue of the fact that inlet 13 is connected to a port, located in the nose or fore portion of the missile. In a comparable sense, a lower variable pressure P is present in chamber 16. This latter pressure P has its origin during flight in the tail surfaces disposed at the after end of the missile with which outlet 14 is connected. The high and low pressure sources are indicated schematically in Fig. 2 and designated respectively by the reference numerals 13', 14'. A battery 15 is illustrated in series electrical connection with a hot wire filament 22, of platinum as previously mentioned, or the like, and a resistor 16, which may be of the order of ten magnitudes the dynamic operating resistance of element 22 for the purpose of maintaining a substantially constant current in the circuit. The platinum hot wire filament may be considerably less than a centimeter in length and its diameter may be of the order of 0.0006 centimeter. It is suitably connected to conductive leads 24 and 25, of copper or the like. The extremities of the filament are imbedded in the material of annulus 18, thereby presenting an exposed segment across the neck or aperture thereof.

Annulus 18, which is comprised of a material having electrical insulating properties, in conjunction with nozzle 12 and the portion of capsule 10 therebetween form a resonant chamber or cavity 17 of the Helmholtz type.

The dimensions of the portions of the embodiment of the invention illustrated which form the resonator may be determined for any selected resonant frequency from the standard formula for a Helmholtz resonator:

$$(1) \quad f_0 = \frac{1}{2\pi}\sqrt{\frac{c^2 S}{l_e v}}$$

where $f_0$ = the selected resonant frequency
$c$ = sonic velocity
$S$ = the area of the aperture in annulus 18
$l_e$ = the effective length of the aperture ($l_e \cong$ eight tenths of the actual length of the aperture)
$v$ = the volume of the cavity formed by annulus 18, nozzle 12, and the portion of capsule 10 therebetween.

Nozzle 12 comprises a convergent entrance section 19, a throat 21, and a diverging exit section 23. The area of throat 21, the significant portion of the nozzle, for any given mass or volumetric flow rate may be determined in accordance with the Laval nozzle equation $$(2) \quad A = \frac{m}{\sqrt{\frac{2k}{k-1}P_0\rho_0\left(\frac{P_1}{P_0}\right)^{\frac{2}{k}}\left[1-\left(\frac{P_1}{P_0}\right)^{\frac{k-1}{k}}\right]}}$$

where $A$ = the area of throat 21
$m$ = the mass flow rate (equal to the product of the volumetric flow rate and the fluid density)
$P_0$ = the pressure at the entrance to nozzle 12
$P_1$ = the pressure at throat 21
$\rho_0$ = the density of the fluid
$k$ = the specific heat of the fluid (approximately equal to 1.4 for air)

The mass flow rate through nozzle 12 (and annulus 18) will remain constant provided the pressure ratio $P_0/P_1$ is maintained equal to a less than a critical value determined in accordance with the following relation:

$$(3) \quad P_c = \frac{P_0}{P_1} = \left(\frac{2}{k+1}\right)^{\frac{k}{k-1}}$$

For air $P_c$ is equal approximately to 0.55. When the pressure ratio $P_0/P_1$ is maintained equal to or less than $P_c$, the velocity of the fluid through throat 21 will be equal to Mach 1. Hence nozzle 12 is referred to as a sonic nozzle.

In missile applications in which the instant invention is employed for the sensing or the tracking of sound impulses emanating from a remote target source, the compressions and rarefactions constituting auditory undulations enter chamber 15 through inlet 13. A signal voltage proportional to the auditory undulations in superposition with the mobile column of air is developed across the length of the hot wire 22. This signal voltage arises by virtue of changes in the intrinsic resistance of the wire in response to undulations comprising compressions and rarefactions in the air column, effecting a direct influence on the temperature of the wire. Thus, the product of these resistance changes and the constant current circulating in the circuit produces a signal voltage proportional to the auditory undulations. This signal voltage may then be applied to an amplifier, and thence to appropriate electrical circuits for achieving ultimate control of the flight of the missile.

Hence, the hot wire auditory device of the instant invention is deemed to be a substantial improvement of the art by providing therein a constant sensitivity characteristic, made possible by combining the inherent operating limitations of a hot wire microphone with the distinctive operational properties of a sonic nozzle. The frequency response of the microphone is enhanced by combining the microphone and nozzle structures with a portion of a capsular enclosure to form a Helmholtz resonator. Not only are manual adjustment techniques completely eliminated, but also, the device of the present invention finds a unique utilitarian applicability in contemporary missile and rocket environments. For brevity the configurations of nozzle 12 and the resonator formed by annulus 18, nozzle 12, and the intermediate portion of capsule 10 will be designated in the following claims respectively by the terms sonic nozzle and Helmholtz resonator. It is to be understood that as used these terms refer to structures constructed in the manner set forth in detail above.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A hot wire auditory device comprising, in combination, a capsular member including an inlet coupled to a high pressure fluid source and an outlet coupled to a low pressure fluid source, sonic nozzle means interposed between the inlet and the outlet to partition the capsular member into a relatively higher pressure chamber associated with the inlet and a relatively lower pressure chamber associated with the outlet, and apertured hot wire microphone means placed within the higher pressure chamber of said capsular member, said fluid sources maintaining the ratio of the nozzle entrance and throat pressures below a value approximately equal to $$\left(\frac{2}{k+1}\right)^{\frac{k}{k-1}}$$

where $k$ designates the specific heat of the fluid, whereby a constant mass flow is maintained past the microphone rendering the sensitivity thereof at a constant maximum level.

2. A hot wire auditory device comprising, in combination, a capsular member including an inlet coupled to a high pressure fluid source and an outlet coupled to a low pressure fluid source, apertured hot wire microphone means, and sonic nozzle means, said microphone means and said sonic nozzle means being spaced between and respectively adjacent the inlet and the outlet within the capsular member to form a Helmholtz resonant cavity for accentuating a predetermined range of audio frequencies, said fluid sources maintaining the ratio of the nozzle entrance and throat pressures below a value approximately equal to $$\left(\frac{2}{k+1}\right)^{\frac{k}{k-1}}$$

where $k$ designates the specific heat of the fluid, whereby a constant mass flow is maintained past said microphone means rendering the sensitivity thereof at a constant maximum level.

3. A hot wire auditory device comprising, in combination, a capsular member, said member comprising an inlet chamber coupled to a source of high pressure fluid and an outlet chamber coupled to a source of low pressure fluid, apertured hot wire microphone means, and sonic nozzle means, said microphone means and said sonic nozzle means being spaced within the capsular member between and respectively adjacent the inlet chamber and the outlet chamber to form a Helmholtz resonant cavity for accentuating a predetermined range of audio frequencies, said fluid sources maintaining the ratio of the nozzle entrance and throat pressures below a value approximately equal to $$\left(\frac{2}{k+1}\right)^{\frac{k}{k-1}}$$

where $k$ designates the specific heat of the fluid, whereby a constant mass flow is maintained past said microphone means rendering the sensitivity thereof at a constant maximum level.

4. A hot wire auditory device comprising, in combination, a cylindrical member including an inlet coupled to a high pressure fluid source and an outlet coupled to a low pressure fluid source, annular apertured hot wire microphone means disposed within the cylindrical member in axial alignment therewith adjacent the inlet to receive auditory undulations and including a filament electrically connected in series with a constant current source, and sonic nozzle means disposed within said cylindrical member in axial alignment therewith adjacent the outlet, said fluid sources maintaining the ratio of the nozzle entrance and throat pressures below a value approximately equal to $$\left(\frac{2}{k+1}\right)^{\frac{k}{k-1}}$$

where $k$ designates the specific heat of the fluid, whereby a constant mass flow is maintained past the filament rendering the sensitivity of said microphone means to the auditory undulations at an invariant maximum level.

5. A hot wire auditory device comprising, in combination, a cylindrical member, said member including an inlet coupled to a source of high pressure fluid and an outlet coupled to a source of low pressure fluid, annular apertured hot wire microphone means disposed in said cylindrical member in axial alignment therewith adjacent the inlet to receive auditory undulations and including a filament electrically connected in series with a constant current source, and sonic nozzle means disposed in said cylindrical member in axial alignment therewith adjacent the outlet, said microphone means and said sonic nozzle means spaced to form a Helmholtz resonant cavity, said fluid sources maintaining the ratio of the nozzle entrance and throat pressures below a value approximately equal to $$\left(\frac{2}{k+1}\right)^{\frac{k}{k-1}}$$

where $k$ designates the specific heat of the fluid, whereby a constant mass flow is maintained past the filament for rendering the sensitivity of said microphone means at a constant maximum level.

References Cited in the file of this patent

UNITED STATES PATENTS 1,588,168     Case  ---------------- June 8, 1926

UNITED STATES PATENT OFFICE
CERTIFICATE OF CORRECTION

Patent No. 2,936,343                                                May 10, 1960

John R. Dale

It is hereby certified that error appears in the printed specification of the above numbered patent requiring correction and that the said Letters Patent should read as corrected below.

Column 3, lines 4 and 9, for "$\Delta R/R$", each occurrence, read -- $\delta R/R$ --; column 4, line 64, after "environments.", the words "For brevity" should appear as the start of a new paragraph; column 5, lines 17 to 20, for $$\left(\frac{2}{k+1}\right)^{\overline{k-1}} \quad \text{read} \quad \left(\frac{2}{k+1}\right)^{\frac{k}{k-1}}$$

Signed and sealed this 18th day of April 1961.

(SEAL)
Attest:
ERNEST W. SWIDER                                         DAVID L. LADD
Attesting Officer                                            Commissioner of Patents